UNITED STATES PATENT OFFICE.

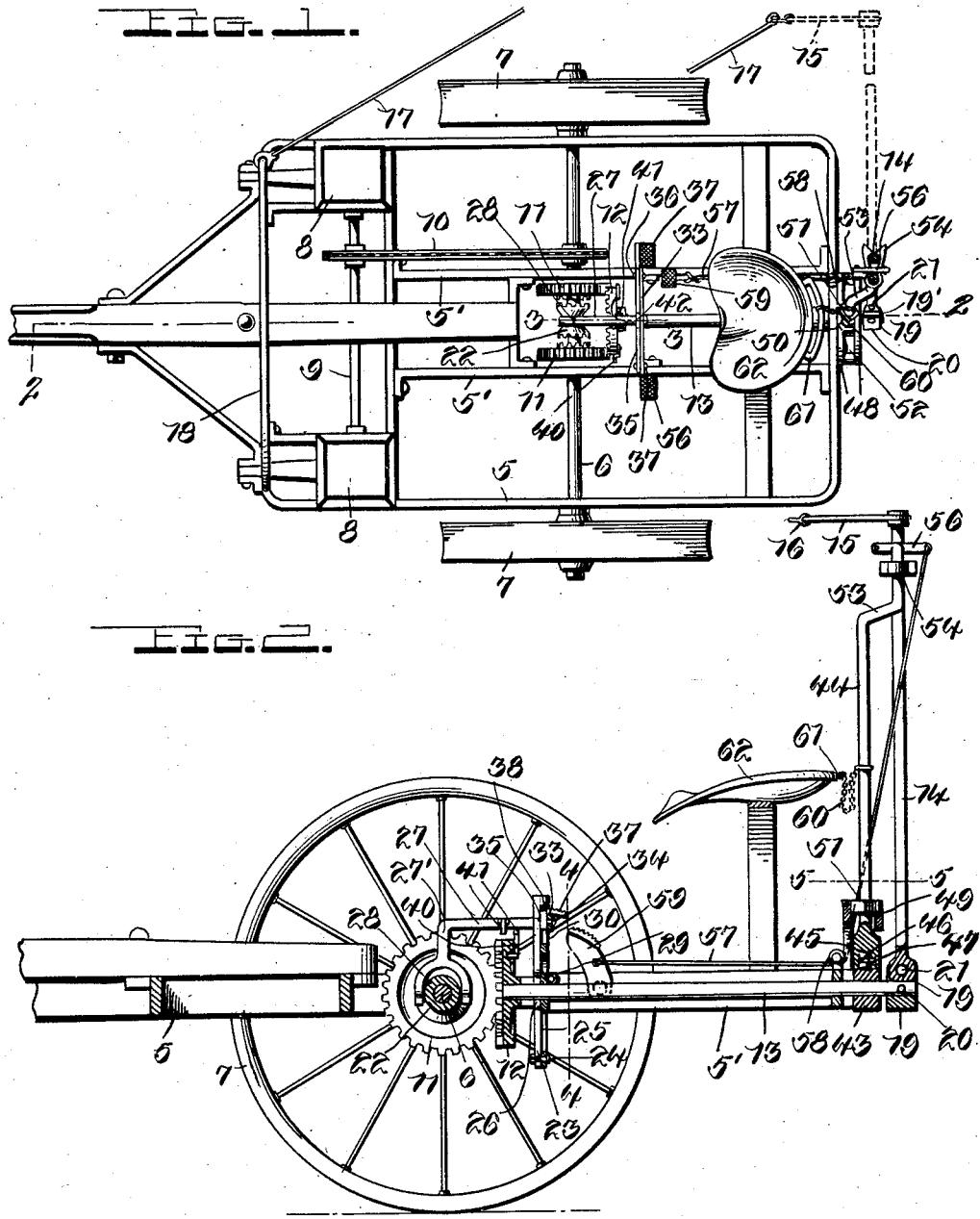

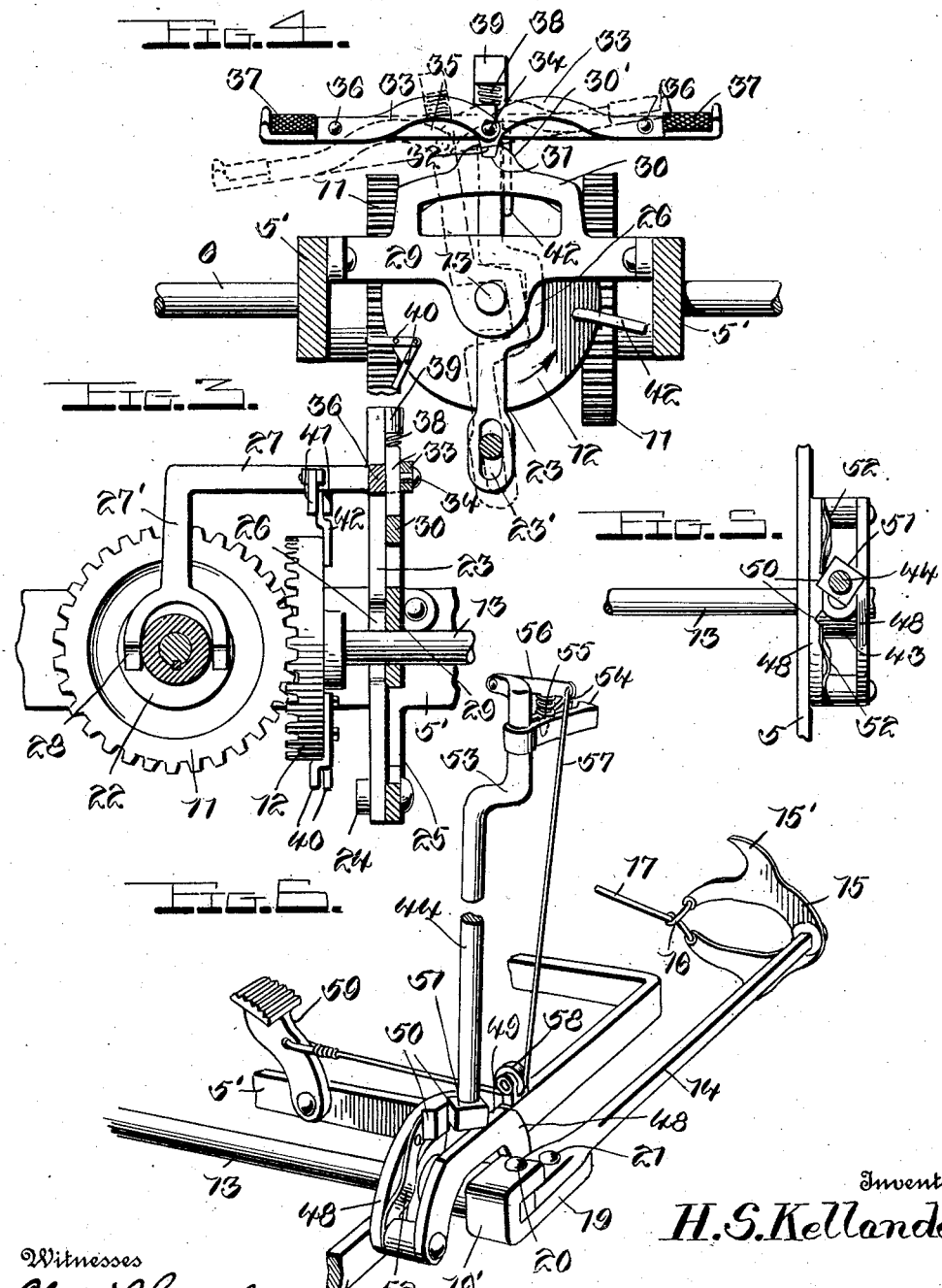

HAROLD S. KELLANDER, OF IMOGENE, MINNESOTA.

LAND-MARKER.

1,010,502.     Specification of Letters Patent.     Patented Dec. 5, 1911.

Application filed December 19, 1910. Serial No. 598,046.

*To all whom it may concern:*

Be it known that I, HAROLD S. KELLANDER, a citizen of the United States, residing at Imogene, in the county of Martin and State of Minnesota, have invented certain new and useful Improvements in Land-Markers, of which the following is a specification, reference being had to the accompanying drawings.

This invention relates to improvements in land markers and has for its principal object to improve the construction and increase the efficiency of a land marker of that character commonly employed on seed planting machines as shown and described in Patent #964,027, issued to me July 12th, 1910.

Another object of the invention resides in the provision of new and novel means for positioning the marker carrying arm upon either side of the machine.

Another object of the invention is to provide a marker arm carrying shaft, a gear on said shaft to mesh with gears loosely mounted on the wheel axle, a sliding clutch on the axle to lock either of the gears thereon and reverse the rotation of said shaft, and means for automatically sliding the clutch to discontinue the rotation of said shaft when the marker arm is in an inoperative position.

A further object of the invention is to provide a movable arm supporting element automatically moved by the movement of said arm to its inoperative position to support said arm for disposition upon either side of the machine, and foot actuated means for releasing the arm.

A still further object of the invention resides in the provision of means for preventing the shifting of the clutch in the wrong direction, such means being automatically positioned to effect the desired function and thereby eliminating injury to the mechanism.

Still another object of the invention is to provide marker arm positioning means which is comparatively simple in construction, may be easily and quickly operated with a minimum amount of labor and is highly efficient and reliable in practical use.

With the above and other objects in view, the invention consists of the novel features of construction, combination and arrangement of parts hereinafter fully described and claimed, and illustrated in the accompanying drawings, in which—

Figure 1 is a top plan view of a seed planting machine showing my improved marker arm operating mechanism arranged thereon; Fig. 2 is a longitudinal section taken on the line 2—2 of Fig. 1; Fig. 3 is a section taken on the line 3—3 of Fig. 1; Fig. 4 is a section taken on the line 4—4 of Fig. 2; Fig. 5 is a section taken on the line 5—5 of Fig. 2; and Fig. 6 is a detail perspective view of the marker arm and supporting means therefor.

In the accompanying drawings there is illustrated a planting machine of a well known form comprising a frame 5 in which a wheel axle 6 is rotatably mounted. The ground wheels 7 are rigidly secured upon the ends of this axle to support the machine. The usual seed boxes 8 are arranged upon the machine frame, the seed dropping mechanism being connected and operated by a transverse shaft 9. This shaft is connected to and driven from the wheel axle by means of a drive chain 10 whereby the seed dropping mechanisms are simultaneously operated to intermittently deposit the seed.

In my prior patent, hereinbefore referred to, there is illustrated suitable gearing for rotating a marker arm carrying shaft, the rotation of said shaft being reversed by a manually shiftable clutch arranged upon the wheel axle. It is one of the objects of the present invention to improve this clutch shifting means whereby the same may be actuated by the foot of the operator to move the marker arm from its operative position on one side of the machine to a vertical inoperative position, and to provide means for automatically moving the clutch to its neutral position as the marker arm is elevated. With this end in view I provide the gears 11 which are loosely mounted upon the wheel axle between the intermediate parallel frame bars 5'. These gears 11 engage the teeth of a crown gear 12 which is rigidly fixed upon the inner end of a longitudinally disposed shaft 13 mounted in the frame of the machine. This shaft extends rearwardly of the frame and has mounted thereon the marking arm 14. The arm 14 is sufficiently long to extend beyond the side of the machine and carries a marking foot 15 which, as shown in Fig. 6 is in the form of two similarly shaped blades which are pivotally fixed at one of their ends to the arm 14 and at their other ends are yieldably connected by means of the spring wire element 16. This element is bent upon itself to provide an intermediate loop to which one end of a cable 17 is connected, the other end of said cable having a ring secured thereto for movement upon a bowed wire 18 arranged upon the forward end of the machine frame and fixed to the opposite sides thereof. The plates 15 are each provided with a fluke 15' which engages the ground surface and provides the guide line in the movement of the machine over the field. The other end of the marker arm 14 is mounted for pivotal movement to a limited extent upon the member 19 which has one of its ends bent into substantially U-shaped form as shown at 19' to receive the squared end of the shaft 13 to which said member is secured by means of a bolt 20. The marker arm 14 is pivotally mounted upon the other end of the member 19 as shown at 21 and the end of said arm is spaced slightly from the shaft 13 and is adapted to engage therewith to limit the pivotal movement of said arm in its operative position and in the movement of said arm to its inoperative position as will more fully appear from the following description.

Between the gears 11 on the wheel axle a sliding clutch head 22 is keyed. This clutch head is provided upon its opposite ends with a plurality of teeth which are adapted to co-act with reversely disposed teeth upon the opposed faces of the gears 11 to lock said gears for rotation upon the wheel axle whereby rotary movement is transmitted through the gear 12 to the marker arm carrying shaft 13. In my prior patent, the clutch 22 is shifted by means of a hand operated lever. In the present case I dispense with this lever and in lieu thereof provide foot operated means which embodies a vertically disposed lever 23 slotted at its lower end as shown at 23' and pivotally mounted upon a pin 24 fixed in the lower ends of the hangers 25 which depend from the longitudinal bars 5' of the machine frame. Intermediate of its ends this lever is bent to provide a substantially U-shaped portion 26 which receives the shaft 13 in the pivotal movement of said lever to shift the clutch head. A forwardly extending arm 27 is carried by the lever 23 and has a right angularly extending end 27' upon which the yoke 28 is formed. The arms of this yoke are disposed in an intermediate annular groove provided in the clutch head. The lever 23 is disposed in a vertical position when the clutch head is out of engagement with the gears 11 and is adapted to be locked in such position upon a rack 30 which is formed upon a transverse bar 29 rigidly secured at its ends to the longitudinal frame bars 5'. The central portion of the rack 30 is slightly raised or elevated as shown at 30' and is provided with a notch 31 to receive the ends 32 of the foot bars 33. These foot bars are pivotally mounted as at 34 adjacent to their ends 32 upon a cross bar 35 which is rigidly fixed upon the upper end of the lever 23. The foot bars 33 are preferably curved adjacent to their inner ends as shown in Fig. 4 and are also pivotally mounted adjacent to their outer ends upon the bar 35, as shown at 36. Upon the outer ends of the bars 33, the foot plates 37 are fixed, whereon the operator's foot is adapted to be placed to depress the outer end of the bar and elevate the inner ends of said bars 32 to remove the same from the notch 31 in the rack, such pressure shifting the clutch head 22 into engagement with one of the gears 11. A spring 38 is arranged between the inner pivotally connected ends of the foot bars 33 and a lug 39 formed upon the upper end of the lever 23. This spring normally acts to yieldingly hold the ends 32 of the foot bars in the notch 31 of the rack to lock the lever 23 in its vertical position.

As thus far described, it will be obvious, that when it is desired to elevate the marker arm 14 from its position at either side of the machine to its inoperative vertical position, the operator simply presses upon the proper foot bar 33. To illustrate, assuming that the marker arm 14 extends upon the left hand side of the machine and it is desired to elevate the same and position the arm on the opposite side of the machine, the operator depresses the left foot bar 33 which shifts the clutch head 22 to the left and locks the left hand gear 11 on the wheel axle. The gear 12 is thus rotated from left to right and the marker arm 14 which is fixed to the shaft 13 is moved to its vertical position. The reverse of this operation, would of course, elevate the marker arm from its position at the right hand side of the machine. Means are provided for automatically returning the clutch head to its neutral position between the gears 11 and to thereby return the lever 23 to its vertical position, and for this purpose I have devised the mechanism disclosed in Figs. 3 and 4 of the drawing. This mechanism comprises the fingers 40 which are arranged in divergent relation upon the rear face of the gear 12 and project beyond the periphery thereof. These fingers are adapted to contact with the pivoted members 41 which are mounted for swinging movement in opposite directions upon the forwardly extending arm 27 of the lever 23. In the movement of the arm 14 from left to right, the lever 23 is moved to the position shown in dotted lines in Fig. 4 to shift the clutch head 22 into engagement with the proper gear 11. The gear 12 rotating in the direction indicated by the arrow causes the fingers 40 to engage the members 41, said fingers and members being arranged upon the gear and arm respectively in different planes. The advance finger 40 engages one of the members 41 and swings the same outwardly moving under said member and beyond the same. The other of the fingers 40 engages the other member 41, which, however, remains stationary, the engagement of said member with the finger moving the lever 23 and arm 27 carried thereby back to its normal vertical position and thus shifting the clutch head 22 to its intermediate position. In this manner the rotation of the shaft 13 is stopped at the time when the arm 14 assumes substantially a vertical position at the rear of the machine. In this return movement of the lever 23 it also moves vertically to insure sufficient space between the fingers 40 and the members 41 to permit said fingers to move under and beyond said pivoted members so that when the lever 23 is again locked upon the rack 30, the fingers 40 will be disposed in the same position with respect to said lever but on the opposite side thereof to the position shown in Fig. 4, when the marker is disposed on the opposite side of the machine. This vertical movement of the lever 23 is effected by the sliding contact of the fingers 40 with the members 41, the lower slotted end of said lever moving longitudinally upon its pivot 24 and the pivotally connected ends 32 of the foot bars 33 riding over the central raised portion 30' of the rack and into the notch 31 thereof.

In order to eliminate all possibility of the operator accidentally shifting the clutch head 22 in the wrong direction and moving the marker arm toward the ground instead of elevating it, I provide the stop arms 42 which are fixed to the rear face of the gear 12 and project beyond the periphery thereof to a greater extent than the fingers 40. These stop arms are so located upon the gear with respect to the lever 23 that, when the marker arm is in operative position upon either side of the machine, one of the stops will be positioned against the lever 23 to prevent its movement to the other side of the machine away from the marker arm which would throw the clutch in the wrong direction. Thus the possibility of serious damage to the operating parts is overcome and the durability of the machine preserved.

Upon the rear end of the shaft 13, a standard is mounted to support the marker arm 14 in its vertical inoperative position. This standard is formed in two sections 43 and 44. The section 43 is loosely mounted upon the shaft 13 and is adapted to be received in a socket 45 formed in the lower end of the section 44. The section 44 of the standard is thus free to rotate upon the section 43. The section 43 is provided with an annular groove 46 to receive a pin 47 which is fixed in the socketed end of the standard section 44 and extends into said groove. In this manner disconnection of the standard sections 43 and 44 is prevented. The section 44 of the standard moves in an arc between the plates 48 which are arranged in parallel relation and are fixed upon the rear transverse bar of the machine frame. These plates are of substantially semicircular form and the rear plate has its upper edge flattened as at 49 so that it is disposed below the plane of the upper edge portion of the other of said plates. The face of the latter plate is provided with spaced grooves or recesses 50 upon opposite sides of its central portion. These recesses receive the corners of a rectangular enlargement 51 formed upon the rotatable standard section 44. This enlargement moves upon the flattened portion 49 of the rear plate 48, and in the arcuate movement of the standard upon the shaft 13, the section 44 is rotated by the engagement of the enlargement 51 in the notches 50 of the plate 48. Leaf springs 52 are secured to the plate 48 which is provided with the notches 50, and these springs limit the downward movement of the standard upon either side of the shaft 13. The upper end of the standard section 44 is offset as shown at 53 to dispose the same in line with the marker arm 14. Upon this offset upper end of the standard the spring plates 54 are arranged to receive between them the marking arm. These plates are similar to those which are employed in my former patent and are adapted to be sprung apart to release the marking arm by means of a wedge-shaped element 55 carried by an arm 56 which is pivoted at one end to the standard. A cable 57 is connected to the other end of this arm and extends around a guide pulley 58 arranged upon the frame of the machine and is connected to a foot plate 59 which is arranged upon the frame of the machine and is adapted to be engaged by the foot of the operator and depressed to force the member 55 between the plates 54 and spread the same apart, thereby releasing the marking arm. This portion of the machine operates as follows: When the clutch head 22 is shifted and the shaft 13 rotated to elevate the marking arm 14 from either side of the machine, the engagement of said arm between the plates 54 moves the standard sections 43 and 44 upon the shaft and between the plates 48. During this movement the upper section 44 is rotated as previously described, said section making one-half of a complete revolution so as to dispose the arm holding plates 54 in the opposite direction. In this rotation of the standard section 44, the arm 14 retains its position between the holding plates and moves at its lower end upon the pivot 20. The clutch head is automatically disengaged from the gear 11 as previously described, and the operator then presses upon the foot plate 59 to open the holding plates 54 whereupon the arm 14 descends upon the opposite side of the machine, the shaft 13 and the gear 12 continuing their rotation. In the event that the movement of the lever 23 to its vertical position is not entirely completed before the disengagement of the finger 40 from the member 41, the stop arm 42 will complete the movement of said lever and cause the ends 32 of the foot bars 33 to engage in the notch 31 of the rack. Thus the mechanism is rendered very positive in its operation.

A chain 60 is secured at one end to the standard section 44 and at its other end is movably disposed upon a guide rod 61 which is fixed to the rear of the operator's seat 62. This chain provides a support and guide for the upper end of the arm supporting standard in its arcuate movement upon the shaft 13.

From the foregoing it is believed that the construction and operation of my improved marker arm operating mechanism will be readily understood. The means for automatically positioning the parts for the proper disposal of the marking arm relieves the operator of considerable labor and attention which would otherwise be necessary to insure the proper disposition of the marker when the machine is turned after reaching one end of the field. The marker arm may be easily and quickly positioned upon the proper side of the machine by the pressure of the operator's foot on the element 59, and the operating parts automatically positioned to dispose the marking arm on the opposite side of the machine when said element is again depressed. The various parts of the mechanism may be readily assembled upon seed planters of the common construction. Furthermore, a machine constructed in accordance with the present invention is very efficient in practical use, strong and durable in construction and may be manufactured at a nominal cost.

While I have shown and described the preferred construction and arrangement of the various parts, it will be understood that the machine is susceptible of considerable modification without departing from the essential feature or sacrificing any of the advantages thereof.

Having thus described the invention what is claimed is:—

1. In a machine of the character described, a marking arm arranged to be operatively positioned upon either side of the machine, operating mechanism to move said arm, means for supporting the arm in an intermediate inoperative position, said means being movable by the marking arm in its movement to its inoperative position to dispose said arm for movement to its operative position upon the opposite side of the machine, and means for automatically rendering said operating mechanism inoperative when the marker arm is moved to its inoperative position.

2. In a machine of the character described, a marking arm arranged to be operatively positioned upon either side of the machine, operating mechanism to move said arm from either of its operative positions to its inoperative position, means adapted to receive and support said arm in its inoperative position, said means being actuated by the impact of the arm therewith to position said arm for movement to its operative position on the opposite side of the machine, means for automatically rendering the operating mechanism inoperative when the marker arm is in its inoperative position, and additional means co-acting with said operating mechanism to prevent movement of the marking arm in one direction from either of its operative positions.

3. In a machine of the character described, the combination of a shaft and means for rotating said shaft, a marking arm on said shaft adapted to be positioned upon one side of the machine and to be moved to a vertical inoperative position by the rotation of said shaft, means for supporting the arm in its inoperative position, means for automatically rendering the shaft rotating means inoperative when the arm is disposed in its inoperative position, means for releasing the arm from said supporting means, and means for automatically positioning said supporting means in the movement of the arm to its inoperative position to dispose said arm upon the opposite side of the machine when the same is released.

4. In a machine of the character described, the combination of a shaft and means for rotating said shaft, a marking arm on said shaft adapted to be positioned upon one side of the machine and to be moved to a vertical inoperative position by the rotation of said shaft, means for supporting the arm in its inoperative position, means for releasing the arm from said supporting means, and means for automatically positioning said supporting means in the movement of the arm to its inoperative position to dispose said arm upon the opposite side of the machine when the same is released.

5. In a machine of the character described, the combination of a shaft and means for rotating the same, a marking arm arranged on said shaft and adapted to extend upon one side of the machine, a standard loosely mounted on the shaft, means carried by the standard to receive the arm and hold the same in an inoperative position, and means for rotating said standard to position the holding means upon either side of the shaft when the marking arm is moved to its inoperative position from either side of the machine.

6. In a machine of the character described, the combination of a shaft and means for rotating the same, a marking arm mounted on said shaft to be positioned upon either side of the machine, means for reversing the rotation of the shaft to move the arm to its operative position upon opposite sides of the machine, means to support the arm in an inoperative position, and means for automatically positioning said supporting means to receive the arm upon the reverse rotation of the shaft.

7. In a machine of the character described, the combination of a shaft and means for rotating the same, a marking arm mounted upon said shaft to be positioned by the rotation of the shaft on either side of the machine, means for reversing the rotation of said shaft, manually actuated holding means to receive and support the marking arm in its inoperative position, said means being movable with the arm after it has been moved to an inoperative position, and means for automatically positioning said holding means to receive the arm upon the reverse rotation of said shaft.

8. In a machine of the character described, the combination of a shaft and means for rotating the same, a marking arm mounted on one end of said shaft, means for reversing the rotation of the shaft to position the marking arm upon either side thereof, means loosely mounted on said shaft to engage said arm and support the same in an inoperative position, and means for positioning said holding means to receive the arm upon the reverse rotation of the shaft.

9. In a machine of the character described, the combination of a shaft and means for rotating the same, a marking arm mounted upon one end of said shaft, means for reversing the rotation of the shaft to position the marking arm on either side thereof, a standard loosely mounted on said shaft, manually actuated holding means carried by the standard adapted to receive and support the marking arm in an inoperative position, said standard being movable with the arm in its movement to its inoperative position, and means for automatically rotating the standard independently of the shaft to position said arm holding means to receive the arm upon the reverse rotation of the shaft.

10. In a machine of the character described, the combination of a shaft and means for rotating the same, a marking arm mounted upon one end of said shaft, means for reversing the rotation of the shaft to position the marking arm on either side thereof, a standard loosely mounted on said shaft, manually actuated holding means carried by the standard adapted to receive and support the marking arm in an inoperative position, said standard being movable with the arm in its movement to its inoperative position, means for automatically rotating the standard independently of the shaft to position said arm holding means to receive the arm upon the reverse rotation of the shaft, and additional means to support said standard after the release of the marking arm.

11. In a machine of the character described, the combination of a shaft and means for rotating the same, a marking arm mounted on said shaft, means for reversing the rotation of the shaft to position the marking arm on either side thereof, a sectional standard loosely mounted on said shaft, one of said sections being rotatable relative to the other, holding means carried by the rotatable section to receive said marking arm and support the same in an inoperative position, means for releasing said arm, and means to engage the rotatable standard section and rotate the same to position said holding means to receive the marking arm upon the reverse rotation of said shaft.

12. In a machine of the character described, the combination of a shaft and means for rotating the same, a marking arm mounted on one end of said shaft, a standard loosely mounted on the shaft, holding means carried by the standard to receive and support the arm in an inoperative position, said standard being movable with the arm, means to position said holding means to receive the marking arm upon the reverse rotation of the shaft, said last named means being operative in the movement of the arm to its inoperative position, means for releasing the marking arm, and means to support the standard against continued movement after the release of the marking arm.

13. In a machine of the character described, the combination of a shaft and means for rotating the same, a marking arm mounted on one end of the shaft, means for reversing the rotation of the shaft to position the marking arm on either side thereof, means loosely mounted on the shaft to hold the arm in an inoperative position, means for positioning said holding means in the movement of the arm to its inoperative position to dispose said holding means upon the opposite side of the shaft, and means for releasing said arm from the holding means to position the arm on the opposite side of the machine.

14. In a machine of the character described, the combination of a shaft and means for rotating the same, a marking arm mounted on one end of said shaft, means for reversing the rotation of said shaft, to position the arm on either side thereof, a standard to support said arm in its inoperative position, said standard comprising two sections, one of said sections being loosely mounted on the shaft, means for rotatably mounting the other of the standard sections on said first named section, means mounted on the rotatable section to receive the marking arm, means for rotating said section in the movement of the arm to its inoperative position, means for releasing the arm from said holding means, and means for yieldingly supporting the rotatable standard section after the release of said arm.

15. In a machine of the character described, the combination of a shaft and means for rotating the same, a marking arm mounted on one end of said shaft to be positioned on either side of the machine, means for reversing the rotation of said shaft, spaced parallel plates mounted upon the frame of the machine, a rotatable support for the marking arm loosely mounted upon the shaft and disposed between said plates, holding means mounted on said support to receive the marking arm, means carried by the support to co-act with one of said plates and rotate the support in the movement of the arm to its inoperative position to dispose said holding means for the disposal of the marking arm on the opposite side of the machine, and means for releasing the marking arm from said holding means.

16. In a machine of the character described, the combination of a shaft and means for rotating the same, a marking arm mounted on said shaft to be disposed upon either side of the machine, means for reversing the rotation of the shaft, a standard loosely mounted on said shaft to support the marking arm in its inoperative position, spaced parallel guide plates arranged upon opposite sides of the standard, holding means for the marking arm carried by the standard, said standard being movable with the arm in the movement of said arm to its inoperative position, a rectangular enlargement formed on said standard, one of said plates having spaced recesses therein to receive the corners of said enlargement and rotate the standard in its movement on the shaft whereby said holding means is positioned for the disposal of the marking arm on the opposite side of the machine, and means for releasing the arm from said holding means.

17. In a machine of the character described, the combination of a shaft and means for rotating the same, a marking arm mounted on said shaft to be disposed upon either side of the machine, means for reversing the rotation of the shaft, a standard loosely mounted on said shaft to support the marking arm in its inoperative position, spaced parallel guide plates arranged upon opposite sides of the standard, holding means for the marking arm carried by the standard, said standard being movable with the arm in the movement of said arm to its inoperative position, a rectangular enlargement formed on said standard, one of said plates having spaced recesses therein to receive the corners of said enlargement and rotate the standard in its movement on the shaft whereby said holding means is positioned for the disposal of the marking arm on the opposite side of the machine, means for releasing the arm from said holding means, and means arranged between the guide plates to support the standard against continued movement on the shaft after the release of the marking arm.

18. In a machine of the character described, the combination of a shaft and means for rotating the same, a marking arm mounted on said shaft to be disposed upon either side of the machine, means for reversing the rotation of the shaft, a standard loosely mounted on said shaft to support the marking arm in its inoperative position, spaced parallel guide plates arranged upon opposite sides of the standard, holding means for the marking arm carried by the standard, said standard being movable with the arm in the movement of said arm to its inoperative position, a rectangular enlargement formed on said standard, one of said plates having spaced recesses therein to receive the corners of said enlargement and rotate the standard in its movement on the shaft whereby said holding means is positioned for the disposal of the marking arm on the opposite side of the machine, means for releasing the arm from said holding means, and means secured to one of said guide plates to limit the movement of said standard on the shaft.

19. In a machine of the character described, the combination of a shaft and means for rotating the same, a marking arm pivotally mounted on said shaft, means for reversing the rotation of the shaft to dispose the marking arm upon either side of the machine, a rotatable standard loosely mounted on the shaft, holding means carried by the standard to receive the marking arm and support the same in an inoperative position, said standard being movable with the arm in the movement of the arm to its inoperative position, means for automatically rotating said standard to position said holding means for the disposal of the arm on the opposite side of the machine, and foot actuated means for releasing the arm from said holding means.

20. In a machine of the character described, the combination with a wheel supported frame, of a shaft mounted in said frame, a gear fixed on said shaft, gears loosely mounted on the wheel axle engaging said shaft and gear, a clutch slidable on the axle to lock either of said gears thereon and reverse the rotation of said shaft, foot actuated means for sliding said clutch, a marking arm mounted on the shaft to be disposed beyond the side of the machine, means for automatically disconnecting the clutch from the gear when the marking arm has been moved to an inoperative position, and means for supporting the arm in its inoperative position.

21. In a machine of the character described, the combination with a wheel supported frame, of a shaft mounted in said frame, gearing connecting the wheel axle and the shaft to rotate the latter, a sliding clutch to reverse the rotation of said shaft, a marking arm mounted on the shaft and disposed beyond the side of the machine in its operative position, means for supporting said arm in a vertical inoperative position, and means for automatically sliding said clutch to a neutral position in the movement of the marking arm to its inoperative position.

22. In a machine of the character described, the combination with a wheel supported frame, of a shaft mounted in said frame, gears loosely mounted on the wheel axle, a gear on said shaft engaged by said loosely mounted gears, a sliding clutch arranged on the wheel axle between the gears to engage the same and reverse the rotation of said shaft, an arm mounted on one end of the shaft and disposed beyond the side of the machine in its operative position and adapted to be moved by the rotation of said shaft to a vertical inoperative position, means for sliding said clutch, and means carried by the gear on the shaft to move the clutch to a neutral position in the movement of the marking arm to its inoperative position.

23. In a machine of the character described, the combination with a wheel supported frame, of a shaft mounted in said frame, a gear fixed on said shaft, gears loosely mounted on the wheel axle engaged with said shaft gear, a sliding clutch between said loosely mounted gears to lock the same on the axle and reverse the rotation of said shaft, means for sliding said clutch, and means carried by the gear on the shaft to move the clutch to a neutral position and limit the positive rotation of said shaft.

24. In a machine of the character described, the combination with a wheel supported frame, of a shaft mounted in said frame, gearing connecting said shaft and the wheel axle, a clutch co-acting with the gearing to reverse the rotation of the shaft, a pivotally mounted lever connected to said clutch to slide the same, and means for automatically moving said lever to dispose the clutch in a neutral position and limit the positive rotation of said shaft.

25. In a machine of the character described, the combination with a wheel supported frame, of a shaft mounted in said frame, a gear fixed on the shaft, gears loosely mounted on the wheel axle engaging said shaft gear, a clutch slidable on the axle to engage said gears and reverse the rotation of said shaft, means for sliding said clutch, and means carried by the gear on said shaft to engage said clutch sliding means and move the clutch to a neutral position and limit the positive rotation of the shaft.

26. In a machine of the character described, the combination with a wheel supported frame, of a shaft mounted in said frame, gearing connecting the wheel axle and the shaft to rotate the latter, a marking arm mounted on said shaft disposed beyond the side of the machine in its operative position, a sliding clutch co-acting with said gearing to reverse the rotation of the shaft and move the marking arm to a vertical inoperative position from either side of the machine, means for sliding said clutch, and means for automatically moving the clutch to a neutral position to discontinue the positive rotation of said shaft after the marking arm is moved to its inoperative position.

27. In a machine of the character described, the combination with a wheel supported frame, of a shaft mounted in said frame, gearing connecting the wheel axle and the shaft to rotate the latter, a marking arm mounted on said shaft disposed beyond the side of the machine in its operative position, a sliding clutch co-acting with said gearing to reverse the rotation of the shaft and move the marking arm to a vertical inoperative position from either side of the machine, means for sliding said clutch, means for automatically moving the clutch to a neutral position to discontinue the positive rotation of said shaft after the marking arm is moved to its inoperative position, and means to prevent the movement of the clutch in the wrong direction.

28. In a machine of the character described, the combination with a wheel supported frame, of a shaft mounted in said frame, gearing connecting the wheel axle and the shaft to rotate the latter, a marking arm mounted on the shaft disposed beyond one side of the machine in its operative position, the rotation of said shaft moving the arm to a vertical inoperative position, a sliding clutch co-acting with the gearing to reverse the rotation of the shaft and move the arm to its inoperative position from either side of the machine, means for sliding said clutch, and means to prevent the sliding movement of the clutch in the wrong direction.

29. In a machine of the character described, the combination with a wheel supported frame, of a shaft mounted in said frame, gearing connecting the wheel axle and the shaft to rotate the latter, a marking arm mounted on said shaft disposed beyond one side of the machine in its operative position, a sliding clutch co-acting with the gearing to reverse the rotation of the shaft and move the marking arm to a vertical inoperative position from either side of the machine, means for sliding said clutch, and means co-acting with said last named means to prevent the movement of the clutch in the wrong direction.

30. In a machine of the character described, the combination with a wheel supported frame, of a shaft mounted in said frame, gearing connecting the wheel axle and the shaft to rotate the latter, a marking arm mounted on said shaft disposed beyond one side of the machine in its operative position, a sliding clutch co-acting with the gearing to reverse the rotation of the shaft and move the marking arm to a vertical inoperative position from either side of the machine, means for sliding said clutch, means to engage said clutch sliding means and actuate the same to move the clutch to a neutral position in the movement of the marking arm to its inoperative position to discontinue the positive rotation of the shaft, and additional means co-acting with the clutch sliding means to prevent the movement of the clutch in the wrong direction.

31. In a machine of the character described, the combination with a wheel supported frame, of a shaft mounted in said frame, gearing connecting the wheel axle and shaft to rotate the latter, a marking arm mounted on the shaft disposed beyond one side of the machine in its operative position, a sliding clutch co-acting with said gearing to reverse the rotation of the shaft and move the marking arm to a vertical inoperative position from either side of the machine, means for supporting the arm in its inoperative position, means for sliding the clutch, means carried by one of the gear elements to engage the clutch sliding means and move the clutch to a neutral position in the movement of the arm to its inoperative position, means co-acting with the arm holding means to release the arm, the gravity movement of said arm continuing the rotation of the shaft, and means carried by the gear element on said shaft disposed in contact with the clutch sliding means at the end of the gravity movement of the arm whereby the movement of the clutch in the wrong direction is prevented.

32. In a machine of the character described, the combination with a wheel supported frame, of a shaft mounted in said frame, gearing on the wheel axle and shaft to rotate the latter, a marking arm mounted on said shaft disposed beyond one side of the machine in its operative position, a sliding clutch co-acting with said gearing to reverse the rotation of the shaft and elevate the arm to an inoperative position from either side of the machine, a pivotally mounted lever connected to said clutch to slide the same, means to secure the lever against pivotal movement to retain the clutch in a neutral position, and means carried by the gear element on the shaft co-acting with means carried by the clutch lever to automatically move the clutch to its neutral position and discontinue the positive rotation of the shaft when the marking arm is moved to its inoperative position.

33. In a machine of the character described, the combination with a wheel supported frame, of a shaft mounted in said frame, gearing on the wheel axle and shaft to rotate the latter, a marking arm mounted on said shaft disposed beyond one side of the machine in its operative position, a sliding clutch to engage the gear on the axle and reverse the rotation of the shaft to move the marking arm to a vertical inoperative position from either side of the machine, a pivotally mounted lever to shift said clutch, pivoted members carried by said lever for movement in opposite directions, spaced fingers arranged on the gear on said shaft to engage said pivoted members in the rotation of said shaft, the engagement of one of said fingers with one of the pivoted members automatically moving the lever to shift the clutch to a neutral position and discontinue the positive rotation of the shaft after the marking arm is moved to its inoperative position, and means co-acting with said lever to prevent the movement of the clutch in the wrong direction.

34. In a machine of the character described, the combination with a wheel supported frame, of a shaft mounted in said frame, gearing on the wheel axle and said shaft to rotate the latter, a marking arm mounted on said shaft disposed beyond one side of the machine in its operative position, a sliding clutch co-acting with the gears on the axle to reverse the rotation of the shaft and elevate the marking arm to an inoperative position from either side of the machine, a pivotally mounted vertically movable lever engaged with said clutch to slide the same, foot bars mounted on said lever, a rack to receive the ends of the foot bars and prevent the pivotal movement of the lever in the neutral position of the clutch, diverging fingers secured to the gear on the shaft, said fingers being disposed in different planes, members pivotally mounted on the clutch lever for movement in opposite directions, the engagement of one of said fingers with one of the pivoted members moving said lever and automatically disconnecting the clutch from the gear, the fingers on the shaft gear moving beneath the members on said lever in the rotation of said gear, and means for preventing the movement of the lever and the sliding of the clutch in the wrong direction.

35. In a machine of the character described, the combination with a wheel supported frame, of a shaft mounted in said frame, gearing connecting the wheel axle and the shaft to rotate the latter, a marking arm mounted on said shaft disposed beyond one side of the machine in its operative position, a sliding clutch co-acting with said gearing to reverse the rotation of the shaft and elevate the arm to an inoperative position from either side of the machine, a pivotally mounted lever connected to the clutch to slide the same, a cross bar secured to said lever, foot bars pivotally mounted on said cross bar adjacent to its ends, the inner ends of said foot bars being pivotally connected, a rack to receive the pivoted ends of the foot bars and secure the lever against pivotal movement, means co-acting with said lever to move the same and dispose the clutch in a neutral position to discontinue the positive rotation of the shaft when the marking arm has been moved to an inoperative position, and means for preventing the movement of the clutch in the wrong direction.

36. In a machine of the character described, the combination with a wheel supported frame, of a shaft mounted in said frame, gearing on the wheel axle and shaft to rotate the latter, a marking arm mounted on the shaft disposed beyond one side of the machine frame in its operative position, a sliding clutch to engage the gearing on the axle and reverse the rotation of the shaft to elevate the marking arm to an inoperative position from either side of the machine, a pivotally mounted vertically movable lever, a lateral arm carried by said lever connected to the clutch to slide the same, fingers arranged on the gear element on the shaft, means on the arm of said lever to be engaged by said fingers in the rotation of said gear to automatically move the clutch to a neutral position and discontinue the positive rotation of the shaft when the marking arm has been moved to its inoperative position, a supporting bar for the shaft arranged in the machine frame, a rack on said bar, means carried by the lever co-acting with said rack to secure the lever against movement and retain the clutch in its neutral position, and arms secured to the gear on said shaft and extending beyond its periphery to engage the lever arm and prevent movement of the lever in the wrong direction.

37. In a machine of the character described, the combination of a shaft and means for rotating the same, a marking arm mounted on one end of said shaft, manually operable means for reversing the rotation of the shaft to position the marking arm upon either side thereof, means for automatically actuating said reversing means in the movement of the marking arm to its inoperative position, and additional means co-acting with said reversing means to prevent movement of the marking arm in the wrong direction from its operative position.

38. In a machine of the character described, a marking arm arranged to be positioned upon either side of the machine, driving mechanism, operating means between the driving mechanism and said marking arm to move the latter from its operative positions to an inoperative position, manually actuable means to connect said driving means and the arm operating means to move the arm to its inoperative position from either side of the machine, and additional means co-acting with said last named means to prevent movement of the marking arm in the wrong direction from its operative position.

39. In a machine of the character described, a marking arm arranged to be operatively positioned upon either side of the machine, driving mechanism, means connecting the arm and driving mechanism whereby said arm is moved from an operative to an inoperative position, and movable means to sustain the arm in its inoperative position and to automatically position said arm for movement to its operative position on the opposite side of the machine.

40. In a machine of the character described, a marking arm arranged to be operatively positioned upon either side of the machine, driving mechanism, means connecting the driving mechanism and the marking arm to move the latter to an intermediate inoperative position, a manually actuable holding device to receive said arm and sustain the same in its inoperative position, said device being mounted for bodily movement to automatically position the arm for movement to its operative position on the opposite side of the machine, and means for automatically rendering the operating means inoperative when the arm has been moved to its inoperative position.

41. In a machine of the character described, the combination with a drive shaft, of a shaft extending at right angles to the drive shaft, gearing connecting said shafts, a marking arm mounted on said latter shaft and disposed beyond the side of the machine in its operative position, a sliding clutch co-acting with said gearing to reverse the rotation of the shaft and move the marking arm to a vertical inoperative position from either side of the machine, and means for preventing the shifting of the clutch in one direction to insure the proper direction of movement of the marking arm from its operative position at either side of the machine.

42. In a machine of the character described, the combination with a drive shaft, a marking arm disposed beyond the side of the machine in its operative position, operating mechanism arranged between the drive shaft and said arm to move the latter from its operative position upon either side of the machine to a vertical inoperative position, manually operable means for reversing the operation of said arm operating means to elevate the arm from its operative positions, and means for automatically actuating said last named means to prevent the successive positive operation of said arm operating means in the same direction.

In testimony whereof I hereunto affix my signature in the presence of two witnesses.

HAROLD S. KELLANDER.

Witnesses:
MILTON E. FALKER,
ANTON E. PAULSEN.

Copies of this patent may be obtained for five cents each, by addressing the "Commissioner of Patents, Washington, D. C."